United States Patent
Yoon et al.

(10) Patent No.: US 9,448,414 B2
(45) Date of Patent: Sep. 20, 2016

(54) POLARIZATION CONTROL UNIT

(71) Applicant: LG DISPLAY CO., LTD., Seoul (KR)

(72) Inventors: Ara Yoon, Seoul (KR); Youngbok Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/567,641

(22) Filed: Dec. 11, 2014

(65) Prior Publication Data

US 2016/0091646 A1 Mar. 31, 2016

(30) Foreign Application Priority Data

Sep. 30, 2014 (KR) ......................... 10 2014 0132074

(51) Int. Cl.
*G02B 27/26* (2006.01)
*G02F 1/1334* (2006.01)
*G02F 1/1343* (2006.01)
*G02F 1/137* (2006.01)

(52) U.S. Cl.
CPC ............... *G02B 27/26* (2013.01); *G02F 1/137* (2013.01); *G02F 1/1334* (2013.01); *G02F 1/134309* (2013.01)

(58) Field of Classification Search
CPC ............... G02B 5/3058; G02B 27/26; G02F 1/134309; G02F 1/1334; G02F 1/137
See application file for complete search history.

(56) References Cited

U.S. PATENT DOCUMENTS

| 7,515,213 | B2 * | 4/2009 | Aramatsu | G02B 27/2214 349/1 |
| 8,928,824 | B2 * | 1/2015 | Chen | G02F 1/29 349/117 |
| 9,213,203 | B2 * | 12/2015 | Cho | G02F 1/134309 |
| 2006/0146267 | A1 * | 7/2006 | Choi | G02F 1/133377 349/156 |
| 2008/0170183 | A1 * | 7/2008 | Sugiyama | G02B 27/2214 349/96 |
| 2008/0278639 | A1 * | 11/2008 | Hamagishi | G02B 27/2214 349/8 |
| 2011/0157498 | A1 * | 6/2011 | Kim | G02F 1/134309 349/15 |
| 2011/0211135 | A1 * | 9/2011 | Sharp | G02B 27/2264 349/15 |
| 2012/0293468 | A1 * | 11/2012 | Chen | G02F 1/133526 345/204 |

FOREIGN PATENT DOCUMENTS

KR 10-2011-0062215 A 6/2011
WO 2013077664 A1 5/2013

* cited by examiner

*Primary Examiner* — Anne Hines
*Assistant Examiner* — Jose M Diaz
(74) *Attorney, Agent, or Firm* — Dentons US LLP

(57) ABSTRACT

Disclosed is a display device that may include a display panel; a polarization control unit on the display panel, the polarization control unit including: a first substrate; a second substrate opposite the first substrate; a first electrode on a surface of the first substrate opposing the second substrate; a second electrode on a surface of the second substrate opposing the first substrate; and a partition wall and a polymer-dispersed liquid crystal layer between the first and second electrodes, wherein liquid crystal molecules of the polymer-dispersed liquid crystal layer are arranged in a space defined by the partition wall.

14 Claims, 5 Drawing Sheets

POLARIZATION CONTROL UNIT

CROSS-REFERENCE TO RELATED APPLICATIONS

This application claims the benefit of the Korean Patent Application No. 10-2014-0132074 filed on Sep. 30, 2014, which is hereby incorporated by reference for all purposes as if fully set forth herein.

BACKGROUND OF THE INVENTION

1. Field of the Invention

The present invention relates to a display device and method of manufacturing the same, and more particularly, to a polarization control unit that is suitable for a 2D/3D image display device.

2. Discussion of the Related Art

Stereoscopic image displays are categorized into stereoscopic displays and auto-stereoscopic displays. The stereoscopic displays, which use parallax image of the left and right eyes of a viewer with a high stereoscopic effect, include glasses-type displays and glasses-free type displays, both of which have been put to practical use.

In the glasses-type displays, left- and right-eye parallax images are displayed on a direct-view display element or a projector by changing the direction of polarization or in a time-division manner, and polarization glasses or liquid crystal shutter glasses are used to represent a stereoscopic image. The glasses-free type displays are generally classified into parallax barrier displays and lenticular displays.

The parallax barrier displays present stereoscopic images separately to the left and right eyes of the viewer by selectively blocking light incident from the display panel using a barrier. A disadvantage of this technology is that it has significant luminance loss because the light passing through the barrier is reduced by about 50% or less as compared with incident light. The lenticular displays present stereoscopic images separately to the left and right eyes by using al lenticular lens positioned between the display panel and the viewer. The lenticular displays have less luminance loss than the parallax barrier displays.

However, the aforementioned parallax barrier and lenticular displays may be difficult to display 2D images because optical separation cannot be switched on and off, with no or less luminance loss.

The switchable display is a display that switches between 2D and 3D by controlling the voltage applied to the liquid crystals, and includes a display panel for displaying an image, a polarization control unit for representing a 3D image and polarizing lenses. A known switchable polarization control unit is disclosed in International Laid-Open Patent Publication No. WO 2013/077664 entitled "Stereoscopic image display device" andAccordingly, a switchable display has been proposed that is switchable between 2D and 3D, filed on May 30, 2013.

This polarization control unit, referred to as a switchable diffuser in this international laid-open patent publication, includes an upper substrate and a lower substrate with electrodes formed on their opposing surfaces and a polymer-dispersed liquid crystal (PDLC) layer disposed between the upper substrate and the lower substrate. The polymer in the polymer-dispersed liquid crystal layer forms a matrix structure that supports the liquid crystal molecules. The polymer alignment in the liquid crystal layer can be controlled by applying a voltage to the polarization control unit, thereby controlling light scattering and transmission.

However, the upper and lower substrates of this polarization control unit should maintain an appropriate distance from each other to avoid contact. Especially, the retardation uniformity issue associated with the bending and thickness variations of the upper and lower substrates may make it difficult to perform optimum retardation design. Such difficulties in optimizing retardation may cause color diffusion by wavelength and light leakage, leading to lower optical efficiency.

Moreover, if the distance between the upper and lower substrates is too narrow, the upper and lower substrates may be shorted due to substrate bending or external pressure, causing a failure.

SUMMARY OF THE INVENTION

Accordingly, the present invention is directed to provide a display device having a polarization control unit and method of manufacturing the same that substantially obviates one or more problems due to limitations and disadvantages of the related art.

An advantage of the present invention is to provide a display device having a polarization control unit with improved optical efficiency.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device may, for example, include a display panel; a polarization control unit on the display panel, the polarization control unit including: a first substrate; a second substrate opposite the first substrate; a first electrode on a surface of the first substrate opposing the second substrate; a second electrode on a surface of the second substrate opposing the first substrate; and a partition wall and a polymer-dispersed liquid crystal layer between the first and second electrodes, wherein liquid crystal molecules of the polymer-dispersed liquid crystal layer are arranged in a space defined by the partition wall.

The polymer-dispersed liquid crystal layer has a refractive index in a range from about 0.15 to about 0.18 and a thickness in a range from about 5.9 μm to about 10.8 μm.

The partition wall may be formed by curing a polymer material.

When no electric field is applied to the first and second electrodes, the liquid crystals of the polymer-dispersed liquid crystal layer are arranged so that the direction of linear polarization of incident light is rotated by about 90°, and when an electric field is applied to the first and second electrodes, the liquid crystals of the polymer-dispersed liquid crystal layer are arranged to allow light pass therethrough substantially without change in polarization direction.

The polarization control unit according to the present invention can reduce product defects because it increases optical efficiency due to reduction in color diffusion by wavelength and reduction in light leakage and prevents contact between the first and second electrodes by setting the refractive index and thickness of the polymer-dispersed liquid crystal layer PDLC to appropriate levels and forming a partition wall between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts. In the following description, detailed descriptions of well-known elements, functions or configurations may be omitted.

A polarization control unit according to an exemplary embodiment of the present invention will now be described with reference to FIGS. 1A and 1B.

Figure 1A:
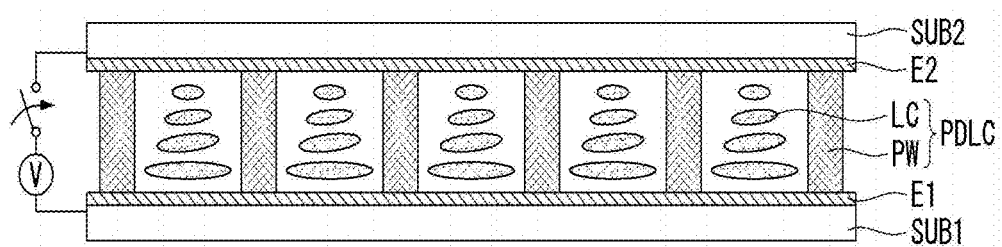
FIG. 1A is a cross-sectional view schematically illustrating a polarization control unit according to an exemplary embodiment of the present invention.

FIG. 1A is a cross-sectional view schematically illustrating a polarization control unit according to an exemplary embodiment of the present invention. FIG. 1B is a top-plan view illustrating a partition wall of the polarization control unit of FIG. 1A.

Figure 1B:
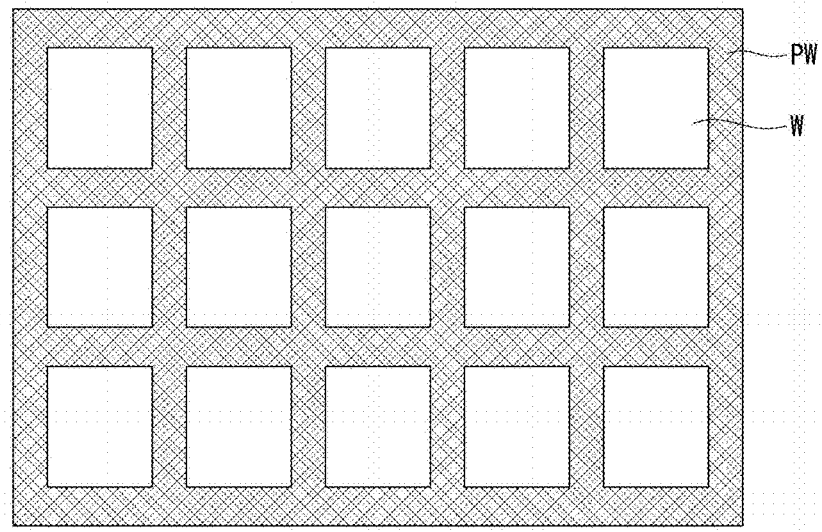
FIG. 1B is a top-plan view illustrating a partition wall of the polarization control unit of FIG. 1A.

Referring to FIGS. 1A and 1B, the polarization control unit according to the exemplary embodiment of the present invention includes a first substrate SUB1, a second substrate SUB2 positioned opposite the first substrate SUB1, a first electrode E1 and a second electrode E2 that are respectively formed on the opposing surfaces of the first and second substrates SUB1 and SUB2, a polymer-dispersed liquid crystal layer PDLC disposed between the first and second electrodes E1 and E2, and a partition wall PW disposed between the first and second electrodes E1 and E2.

The first substrate SUB1 and the second substrate SUB2 may be formed of a transparent optically isotropic material. For example, they may be formed of a film made of a plastic material such as polyethylene terephthalate (PET), triacetyl cellulose (TAC), or polycarbonate (PC). But the material of the first and second substrates SUB1 and SUB2 is not limited thereto. Alternatively, the first substrate SUB1 and the second substrate SUB2 may be formed of an organic or inorganic composite material that is a transparent optically isotropic material.

The first electrode E1 and the second electrode E2 are formed of a transparent conductive material such as ITO (indium tin oxide), IZO (indium zinc oxide), or GZO (gallium-doped zinc oxide).

The polymer-dispersed liquid crystal layer PDLC includes a liquid crystal material LC defined by the partition wall PW. The partition wall PW is formed by, for example, mixing the liquid crystal material and a monomeric polymer material in a liquid state and curing the mixture with ultraviolet rays using a photomask. By radiating ultraviolet rays using a photomask having a light blocking portion and a light transmitting portion, the light incident through the light transmitting portion cures the polymer to form the partition wall PW having a plurality of windows W, as illustrated in FIG. 1B. Although the windows W of the partition wall PW of FIG. 1B have a rectangular shape, the shape of the windows is not limited to this example and may have various shapes.

The partition wall PW is disposed between the first substrate SUB1 and the second substrate SUB2 and supports the first substrate SUB1 and the second substrate SUB2. This prevents the first and second electrodes E1 and E2, respectively formed on the opposing surfaces of the first and second substrates SUB1 and SUB2, from being shorted due to substrate bending or external pressure. Therefore, product defects in the polarization control unit can be reduced or avoided.

In the exemplary embodiment of the present invention, the liquid crystal molecules of the polymer-dispersed liquid crystal layer PDLC have a refractive index $\Delta n$ in a range from about 0.15 to about 0.18 and a thickness d in a range from about 5.9 μm to about 10.8 μm. For precise polarization control, it is beneficial for the polymer-dispersed liquid crystal layer PDLC to be uniform in retardation. Retardation is determined by $\Delta n \times d$ ($\Delta nd$), wherein $\Delta n$ is a component determined by the material constituting the polymer-dispersed liquid crystal layer, and d is a factor determined by physical thickness of the polymer-dispersed liquid crystal layer. Thus, it may be easier to control the retardation of the polymer-dispersed liquid crystal layer PDLC by controlling the thickness of the polymer-dispersed liquid crystal layer PDLC.

Hereinafter, determination of the thickness of the polymer-dispersed liquid crystal layer PDLC will be described in more detail with reference to FIGS. 2 to 5.

Figure 2:
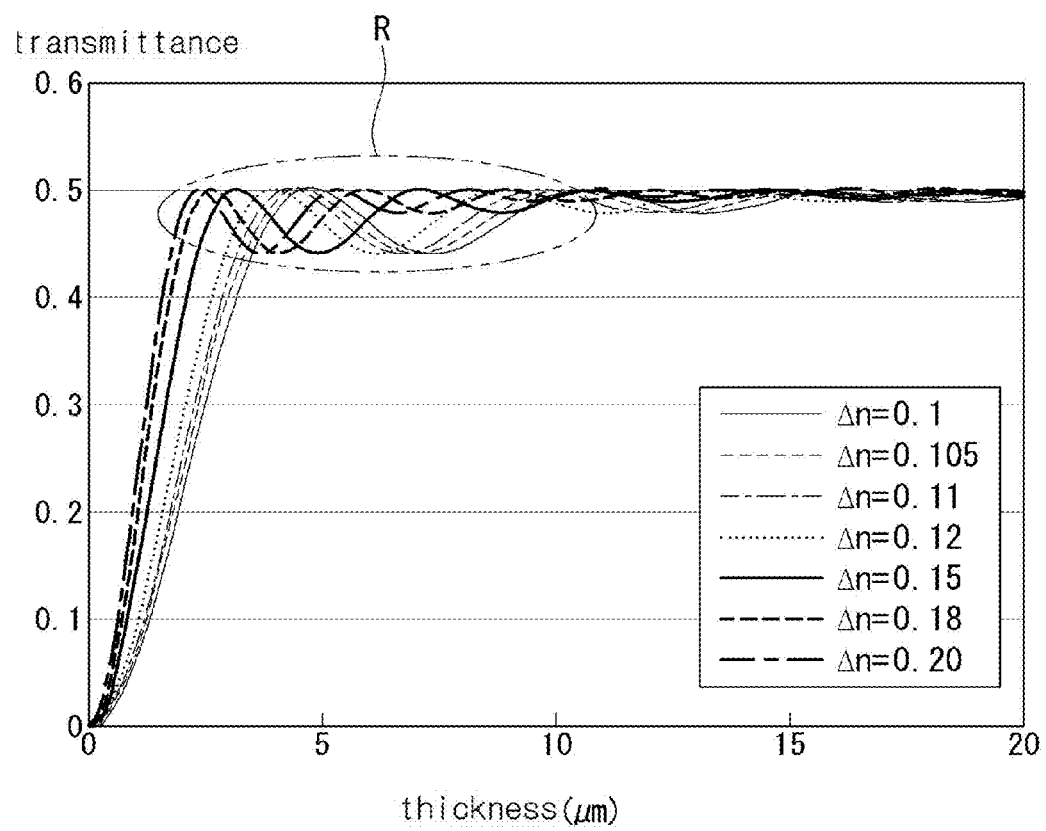
FIG. 2 is a graph showing the transmittance to thickness (d) of a polymer-dispersed liquid crystal layer PDLC with various refractive indices.
Figure 3:
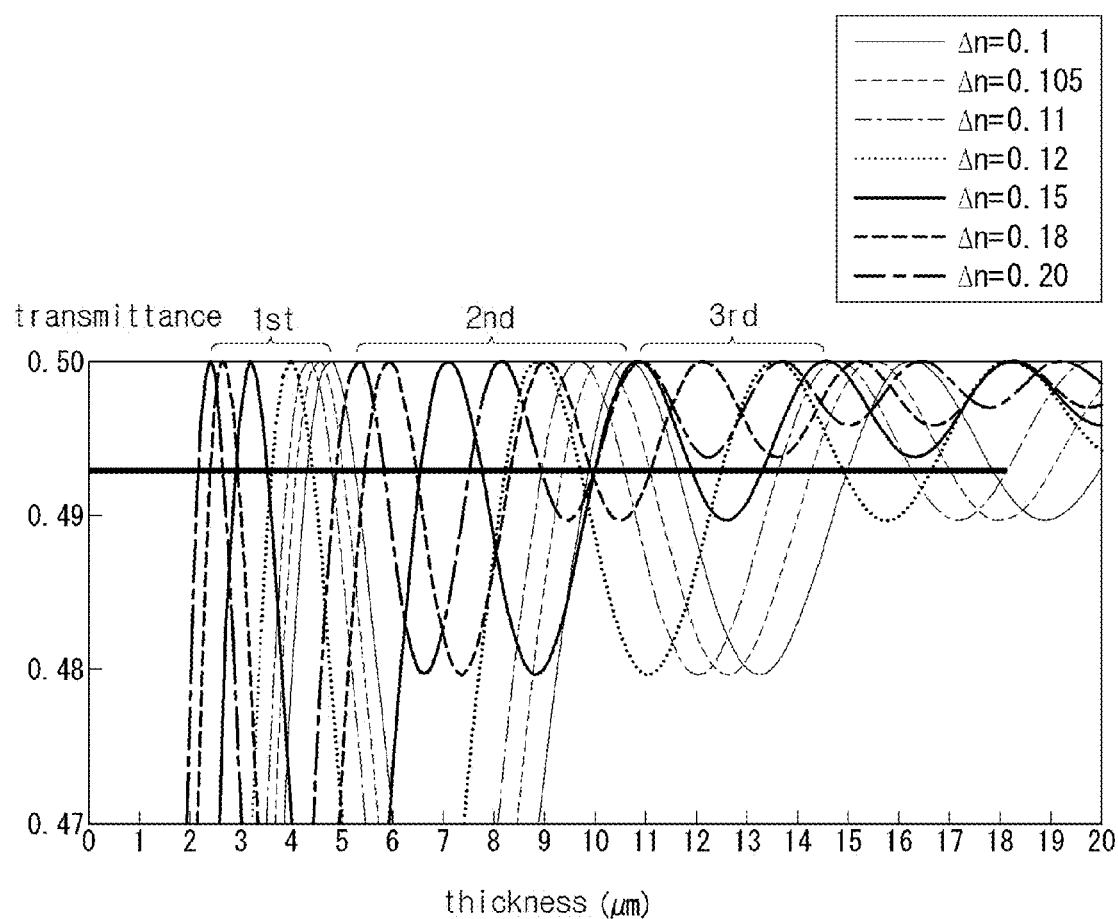
FIG. 3 is an enlarged graph of region R of FIG. 2.
Figure 4:
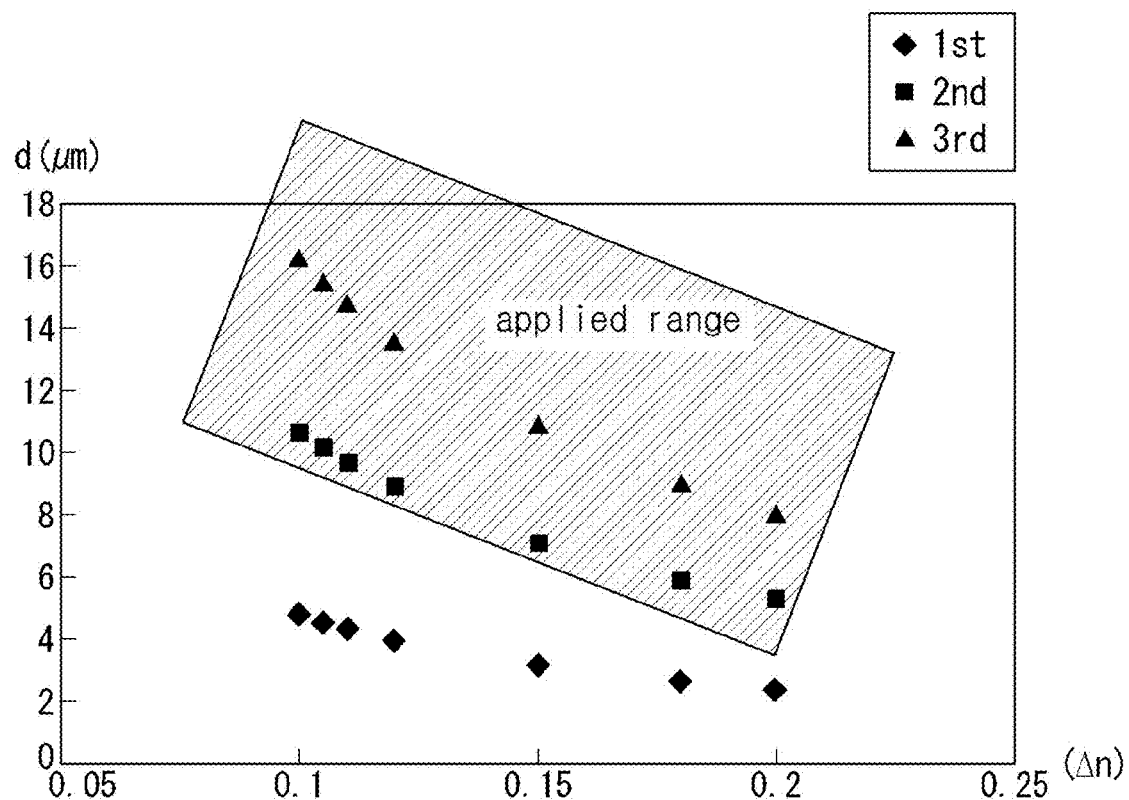
FIG. 4 is a graph illustrating the thickness range of the polymer-dispersed liquid crystal layer PDLC applicable to each $\Delta n$ according to an exemplary embodiment of the present invention.

FIG. 2 is a graph showing the transmittance to thickness d of a polymer-dispersed liquid crystal layer PDLC with various refractive indices $\Delta n$. FIG. 3 is an enlarged graph of region R of FIG. 2. FIG. 4 is a graph showing the thickness range of the polymer-dispersed liquid crystal layer PDLC applicable to each $\Delta n$ according to an exemplary embodiment of the present invention.

The direction of polarization of incident light is changed depending on whether or not an electric field is applied to the polymer-dispersed liquid crystal layer PDLC. The following Table 1 shows the thickness of the polymer-dispersed liquid crystal layer PDLC for each $\Delta n$ that satisfies Maugin condition. In Table 1, the first to third maximum values represent the thickness of the polymer-dispersed liquid crystal layer PDLC for each $\Delta n$ that can achieve a specific level of transmittance on a periodic basis.

TABLE 1

| | Δn | | | | | | |
|---|---|---|---|---|---|---|---|
| | 0.1 | 0.105 | 0.11 | 0.12 | 0.15 | 0.18 | 0.2 |
| 1st maximum value (μm) | 4.76 ± 0.48 | 4.54 ± 0.46 | 4.33 ± 00.43 | 3.97 ± 0.4 | 3.18 ± 0.32 | 2.65 ± 0.27 | 2.40 ± 0.24 |
| 2nd maximum value (μm) | 10.65 ± 1.1 | 10.14 ± 0.96 | 9.68 ± 0.9 | 8.88 ± 0.68 | 7.10 ± 0.6 | 5.92 ± 0.48 | 5.3 ± 0.4 |
| 3rd maximum value (μm) | 16.27 ± 1.6 | 15.49 ± 1.5 | 14.79 ± 1.4 | 13.56 ± 1.25 | 10.85 ± 0.95 | 9.04 ± 0.8 | 8.1 ± 0.7 |

As can be seen from Table 1 and FIGS. 2 and 3, a maximum transmittance having a specific value (e.g. 0.5 in FIG. 2) is periodically generated at various refractive indices Δn, and the thickness of polymer-dispersed liquid crystal layer PDLC increases as it goes from the first to the next maximum transmittance values.

As shown in Table 1, the first maximum value for achieving maximum transmittance may not be appropriate for the formation of the partition wall PW of the polymer-dispersed liquid crystal layer PDLC in the manufacturing process because the thickness d of the polymer-dispersed liquid crystal layer PDLC becomes too small. The fourth to next maximum values may also be inappropriate because the thickness d of the polymer-dispersed liquid crystal layer PDLC becomes too large. As a result, it is preferable that the thickness d of the polymer-dispersed liquid crystal layer PDLC is selected from between the second and third maximum values.

Moreover, if the refractive index Δn of the polymer-dispersed liquid crystal layer PDLC is 0.11 or less, the thickness becomes too large, and if the refractive index Δn of the polymer-dispersed liquid crystal layer PDLC is 0.20 or greater, the thickness becomes too small, which may make it hard to form the side wall during the manufacturing process. As a result, it is preferable that the refractive index is in a range from about 0.15 to about 0.18 and the thickness (d) is in a range from about 5.9 μm to about 10.8 μm.

The above-described polarization control unit according to the exemplary embodiment of the present invention is disposed on a display device if applied to it, and transmits light supplied from the display device substantially without refraction or linearly polarizes it by about 90° depending on whether or not a voltage V is applied.

Operation of the polarization control unit according to the exemplary embodiment of the present invention will now be described with reference to FIGS. 5A and 5B.

Figure 5A:
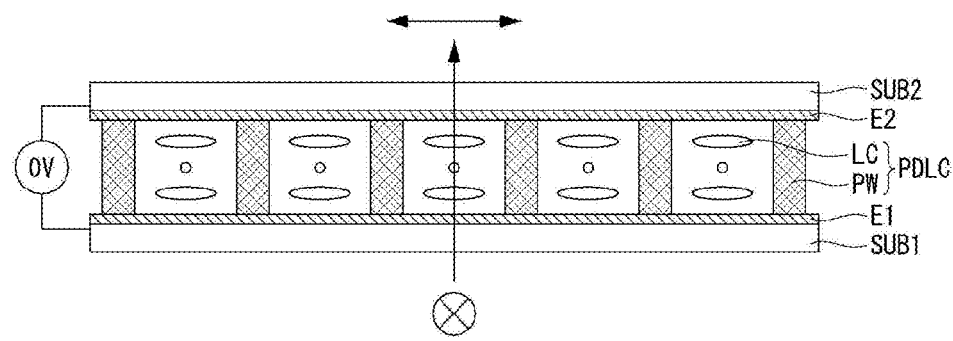
FIG. 5A is a cross-sectional view for explaining the direction of polarization of light when no electric field is applied to the polarization control unit according to the exemplary embodiment of the present invention.
Figure 5B:
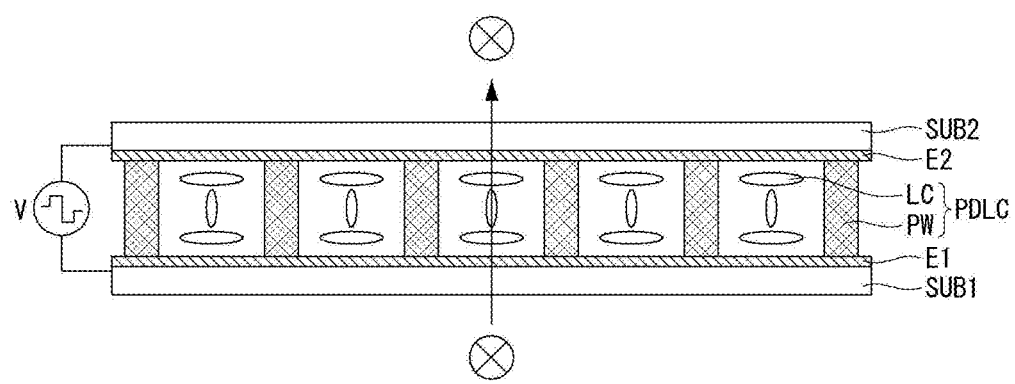
FIG. 5B is a cross-sectional view for explaining the direction of polarization of light when an electric field is applied to the polarization control unit according to the exemplary embodiment of the present invention.

FIG. 5A is a cross-sectional view for explaining the direction of polarization of light when no electric field is applied to the polarization control unit according to the exemplary embodiment of the present invention. FIG. 5B is a cross-sectional view for explaining the direction of polarization of light when an electric field is applied to the polarization control unit according to the exemplary embodiment of the present invention.

As illustrated in FIG. 5A, when no electric field is applied to the polarization control unit, the liquid crystal molecules are arranged so that the polarization direction of the incident light is rotated by about 90°, changing from a vertical linear polarization (indicated by ⊗) to a horizontal linear polarization (indicated by ↔). On the other hand, as illustrated in FIG. 5B, when an electric field is applied to the polarization control unit, the liquid crystal molecules are arranged so that the incident light passes through the polarization control unit substantially without its polarization direction being changed.

In other words, as illustrated in FIG. 5A, when no electric field is applied to the polarization control unit, the polarization control unit converts the incident light whose polarization axis is vertical ⊗ into the light whose polarization axis is horizontal ↔ and then transmits the light. As illustrated in FIG. 5B, when an electric field is applied to the polarization control unit, the polarization control unit transmits the light whose polarization axis is vertical ⊗ substantially without refraction, and thus the polarization direction of the transmitted light becomes vertical.

The above-described polarization control unit according to the exemplary embodiment of the present invention can increase optical efficiency by reducing color diffusion by wavelength and light leakage. Also, it can reduce or prevent contact between the first and second electrodes by setting the refractive index and thickness of the polymer-dispersed liquid crystal layer PDLC to appropriate levels with a partition wall formed between the two substrates.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
    a display panel;
    a polarization control unit on the display panel, the polarization control unit including:
        a first substrate;
        a second substrate opposite the first substrate;
        a first electrode on a surface of the first substrate opposing the second substrate;
        a second electrode on a surface of the second substrate opposing the first substrate; and
        a partition wall and a polymer-dispersed liquid crystal layer between the first and second electrodes, wherein liquid crystal molecules of the polymer-dispersed liquid crystal layer are arranged in a space defined by the partition wall,
    wherein the polymer-dispersed liquid crystal layer has a thickness in a range from about 5.9 μm to about 10.8 μm.

2. The display device of claim 1, wherein the polymer-dispersed liquid crystal layer has a refractive index in a range from about 0.15 to about 0.18.

3. The display device of claim 1, wherein the partition wall is formed by curing a polymer material.

4. The display device of claim 1, wherein, when no electric field is applied to the first and second electrodes, the liquid crystal molecules of the polymer-dispersed liquid crystal layer are arranged so that a polarization direction of an incident light is rotated by about 90°, and when an electric field is applied to the first and second electrodes, the liquid crystal molecules of the polymer-dispersed liquid crystal layer are arranged to allow the incident light to pass through the polarization control unit substantially without change in polarization direction.

5. The display device of claim 1, wherein the partition wall has a plurality of windows having a shape of rectangular.

6. The display device of claim 5, wherein the liquid crystal molecules of the polymer-dispersed liquid crystal layer are arranged in the plurality of windows.

7. The display device of claim 4, wherein when the polarization direction of the incident light is rotated by substantially 90°, the polarization direction changes from a vertical linear polarization to a horizontal linear polarization.

8. A display device comprising:
a display panel;
a polarization control unit on the display panel, the polarization control unit including:
a first substrate;
a second substrate opposite the first substrate;
a first electrode on a surface of the first substrate opposing the second substrate;
a second electrode on a surface of the second substrate opposing the first substrate; and
a partition wall and a polymer-dispersed liquid crystal layer including a UV-curable material between the first and second electrodes,
wherein the polymer-dispersed liquid crystal layer has a refractive index in a range from about 0.15 to about 0.18.

9. The display device of claim 8, wherein the polymer-dispersed liquid crystal layer has a thickness in a range from about 5.9 µm to about 10.8 µm.

10. The display device of claim 8, wherein the partition wall is formed by curing a polymer material.

11. The display device of claim 8, wherein, when no electric field is applied to the first and second electrodes, the liquid crystal molecules of the polymer-dispersed liquid crystal layer are arranged so that a polarization direction of an incident light is rotated by about 90°, and when an electric field is applied to the first and second electrodes, the liquid crystal molecules of the polymer-dispersed liquid crystal layer are arranged to allow the incident light to pass through the polarization control unit substantially without change in polarization direction.

12. The display device of claim 8, wherein the partition wall has a plurality of windows having a shape of rectangular.

13. The display device of claim 12, wherein the liquid crystal molecules of the polymer-dispersed liquid crystal layer are arranged in the plurality of windows.

14. The display device of claim 8, wherein when the polarization direction of the incident light is rotated by substantially 90°, the polarization direction changes from a vertical linear polarization to a horizontal linear polarization.

* * * * *